US006981254B2

(12) United States Patent
Parry

(10) Patent No.: US 6,981,254 B2
(45) Date of Patent: Dec. 27, 2005

(54) DELAY TIMER FOR PRINTING FROM THE DRIVER

(75) Inventor: Travis Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 09/774,795

(22) Filed: Feb. 1, 2001

(65) Prior Publication Data

US 2002/0120659 A1 Aug. 29, 2002

(51) Int. Cl.$^7$ .............................. G06F 9/445
(52) U.S. Cl. ............ 718/100; 709/201; 709/206; 715/700; 715/748; 715/752; 715/758; 715/764; 717/174; 707/1
(58) Field of Search ................ 719/321–327, 719/310, 320; 718/100; 709/201, 206; 707/1; 715/700, 748, 758, 752, 764; 379/93.01

(56) References Cited

U.S. PATENT DOCUMENTS

| | | | | |
|---|---|---|---|---|
| 4,284,362 A | | 8/1981 | Jackson et al. ............ 400/124 |
| 4,761,087 A | * | 8/1988 | Ward et al. ................ 400/621 |
| 4,843,571 A | * | 6/1989 | Notermans et al. ........ 358/1.18 |
| 5,023,633 A | * | 6/1991 | Ito ............................ 347/139 |
| 5,293,468 A | | 3/1994 | Nye et al. .................. 395/131 |
| 5,312,193 A | * | 5/1994 | Kringe et al. .......... 400/124.04 |
| 5,542,088 A | * | 7/1996 | Jennings et al. ............ 718/103 |
| 5,559,933 A | * | 9/1996 | Boswell .................... 358/1.15 |
| 5,579,447 A | * | 11/1996 | Salgado ...................... 174/48 |
| 5,603,054 A | * | 2/1997 | Theimer et al. .............. 710/6 |
| 5,754,744 A | * | 5/1998 | Matsumoto et al. ....... 358/1.13 |
| 5,760,775 A | | 6/1998 | Sklut et al. ................ 345/349 |
| 5,815,764 A | | 9/1998 | Tomory ...................... 399/1 |
| 5,831,611 A | * | 11/1998 | Kennedy et al. ............ 715/763 |
| 5,861,958 A | * | 1/1999 | Jamrog ...................... 358/403 |
| 6,055,240 A | * | 4/2000 | Tunnicliffe ................ 370/428 |
| 6,104,496 A | * | 8/2000 | Minowa et al. ............ 358/1.12 |
| 6,160,629 A | * | 12/2000 | Tang et al. ................ 358/1.1 |
| 6,160,631 A | * | 12/2000 | Okimoto et al. ........... 358/1.15 |
| 6,188,422 B1 | * | 2/2001 | Ogura ...................... 347/171 |
| 6,229,622 B1 | * | 5/2001 | Takeda .................... 358/1.16 |
| 6,240,460 B1 | * | 5/2001 | Mitsutake et al. .......... 709/235 |
| RE37,258 E | * | 7/2001 | Patel et al. ................ 358/1.15 |
| 6,268,926 B1 | * | 7/2001 | Okimoto et al. ........... 358/1.15 |
| 6,304,909 B1 | * | 10/2001 | Mullaly et al. ............ 709/232 |
| 6,310,694 B1 | * | 10/2001 | Okimoto et al. ........... 358/1.15 |
| 6,333,791 B1 | * | 12/2001 | Okimoto et al. ........... 358/1.18 |
| 6,348,971 B2 | * | 2/2002 | Owa et al. ................ 358/1.15 |
| 6,359,642 B1 | * | 3/2002 | Smith et al. ................ 347/247 |
| 6,404,507 B1 | * | 6/2002 | Hamamoto et al. .......... 358/1.5 |
| 6,415,304 B1 | * | 7/2002 | Horvitz .................... 715/500.1 |
| 6,421,135 B1 | * | 7/2002 | Fresk et al. ................ 358/1.15 |

(Continued)

FOREIGN PATENT DOCUMENTS

JP 07309498 A * 11/1995 .......... B65H 29/36

(Continued)

OTHER PUBLICATIONS

Digital Equipment Corporation. "OpenVMS User's Manual." Mar. 1994.*

(Continued)

Primary Examiner—Lewis A. Bullock, Jr.

(57) ABSTRACT

The present invention includes computer programs on computer-readable media that allows for controlling a computer system to perform a delayed operation such as, but not limited to, a print command, an e-mailing distribution, a software installation, a file transfer protocol upload, a web site posting and an internet phone call. The present invention also includes methods for controlling a computer system to perform the above-discussed delayed operations and a computing system capable of performing the above-discussed delayed operations.

16 Claims, 4 Drawing Sheets

U.S. PATENT DOCUMENTS

| | | | |
|---|---|---|---|
| 6,426,799 B1 * | 7/2002 | Okimoto et al. | 358/1.15 |
| 6,438,217 B1 * | 8/2002 | Huna | 379/88.14 |
| 6,449,055 B1 * | 9/2002 | Okimoto et al. | 358/1.15 |
| 6,460,074 B1 * | 10/2002 | Fishkin | 709/206 |
| 6,489,978 B1 * | 12/2002 | Gong et al. | 715/845 |
| 6,552,813 B2 * | 4/2003 | Yacoub | 358/1.1 |
| 6,567,176 B1 * | 5/2003 | Jeyachandran et al. | 358/1.14 |
| 6,594,028 B1 * | 7/2003 | Hamamoto et al. | 358/1.15 |
| 6,615,372 B1 * | 9/2003 | Wang | 714/46 |
| 6,693,720 B1 * | 2/2004 | Livingston | 358/1.15 |
| 6,785,727 B1 * | 8/2004 | Yamazaki | 709/229 |
| 6,791,703 B1 * | 9/2004 | Maeda et al. | 358/1.15 |
| 6,853,390 B1 * | 2/2005 | Wandersleben et al. | 715/802 |
| 2002/0051182 A1 * | 5/2002 | Sommer et al. | 358/1.15 |
| 2002/0054322 A1 * | 5/2002 | Geeten et al. | 358/1.15 |

FOREIGN PATENT DOCUMENTS

| | | | | |
|---|---|---|---|---|
| JP | 08272550 A | * | 10/1996 | G06F 3/12 |
| JP | 09057954 A | * | 3/1997 | B41J 2/01 |
| JP | 11175288 A | * | 7/1999 | G06F 3/12 |

OTHER PUBLICATIONS

Digital Equipment Corporation. "DECwindows User's Guide." Aug. 1994.*

* cited by examiner

DELAY TIMER FOR PRINTING FROM THE DRIVER

BACKGROUND

1. Field of the Invention

Certain embodiments of the present invention relate to computer operation, for example, printing a document using a computer and a printer. In particular, certain embodiments of the present invention relate to including a user-specified time delay in computer operations, for example, between when a user places a print job in a print queue and when the document is actually printed.

2. Description of the Related Art

A driver, in the context of the present invention, is a computer program that generally interacts with a printer or other computer hardware device (e.g., the keyboard or the cursor control device) but that can, in certain situations, also interact with a software program. The driver contains the precise machine language necessary to perform the functions requested by the application using the driver. In personal computers, drivers are often packaged and known as dynamic link library (DLL) files and DLL files that support specific device operations are known as device drivers.

When printing a document, a user of a currently-available word-processing application, such as the MICROSOFT WORD program, selects a "Print" icon from a pull-down menu of the word-processing application. This selection brings up a graphics device interface (GDI), permitting the user to accept or alter the default settings of the GDI and instruct the GDI to send commands (e.g., a print job) to the printer driver for a user-specified printer. According to currently-available word-processing applications, the printer driver is engaged almost instantaneously after the GDI sends commands to it and a document is printed shortly thereafter.

3. Disadvantages of the Related Art

However, in currently-available word-processing applications, there is no way to pause a print job for even a small amount of time in order to perform a short task before retrieving the print job. For example, the user cannot pause the print job for 5–10 minutes in order to travel to another location to retrieve the document from a specialized printer, go to the restroom or place a phone call. The lack of such an ability gives rise to the possibility of a person accidentally walking away with someone else's print job when retrieving their own.

In addition, current word-processing applications do not allow a user to request that a print job be held in a print queue for several hours or overnight to allow the computer user to retrieve the document at the end of the business day or early the next morning. The lack of such an ability gives rise to the possibility of one or a few users "bogging down" a company's printer with large print jobs that are of low priority while high-priority jobs are forced to wait their turn in the print queue.

Hence, what is needed is a computer-readable medium, a method and/or a computing system that allows for a printing delay to be specified by the user.

What is further needed is a computer-readable medium, a method and/or a computing system that includes a printing option that allows for avoiding one or several users during certain hours with a high-volume, low-priority print job.

SUMMARY OF THE INVENTION

Certain embodiments of the present invention are directed to a computer program product including a computer-readable medium containing instructions for controlling a computer system to perform a method of delaying an operation, the method including, requesting that a user input a delay criteria and delaying performance by the computer system of the operation until the delay criteria has been met, wherein the operation includes at least one operation chosen from the group consisting of a print command, an e-mailing distribution, a software installation, a file transfer protocol (FTP) upload, a web site posting and an internet phone call Certain embodiments of the present invention are directed at a method for controlling a computer system to perform a delayed operation including requesting that a user input a delay criteria and delaying performance of the operation until the delay criteria has been met; wherein the operation includes at least one operation chosen from the group consisting of a print command, an e-mailing distribution, a software installation, an FTP upload, a web site posting and an internet phone call.

Certain embodiments of the present invention are directed at a computing system including a processor, a user-programmable delaying device operably connected to the processor, a storage device operably connected to the processor and a printer operably connected to the storage device.

Therefore, certain embodiments of the present invention provide a computer-readable medium, a method and/or a computing system that allows for a printing delay to be specified by the user.

Also, certain embodiments of the present invention provide a computer-readable medium, a method and/or a computing system that includes a printing option that allows for avoiding one or several users during certain hours with a high-volume, low-priority print job.

Among the advantages of certain embodiments of the present invention is that they allow for additional confidentiality of printed documents. With user-determined delays, users can give themselves enough time, for example, to walk over to the printer, corporate graphics department or commercial print shop to supervise the print job being printed as hard copies and to retrieve the documents immediately following the printing.

Beyond confidentiality, delayed printing can also provide for added efficiency, particularly if entities such as a corporate graphics department or commercial print shop are used. Currently, these entities must (1) receive the print job from the user's computer, (2) file the hard copies of the print job after they have been printed and (3) retrieve the hard copies when the user arrives. In contrast, certain embodiments of the present invention allow users to synchronize their arrival with the arrival of the print job and to obtain hard copies "hot off of the presses" before they are ever filed.

BRIEF DESCRIPTION OF THE DRAWINGS

The objects, features, and advantages of the present invention will be apparent from the following detailed description of embodiments of the invention with references to the following drawings.

DETAILED DESCRIPTION OF THE INVENTION

Figure 1:
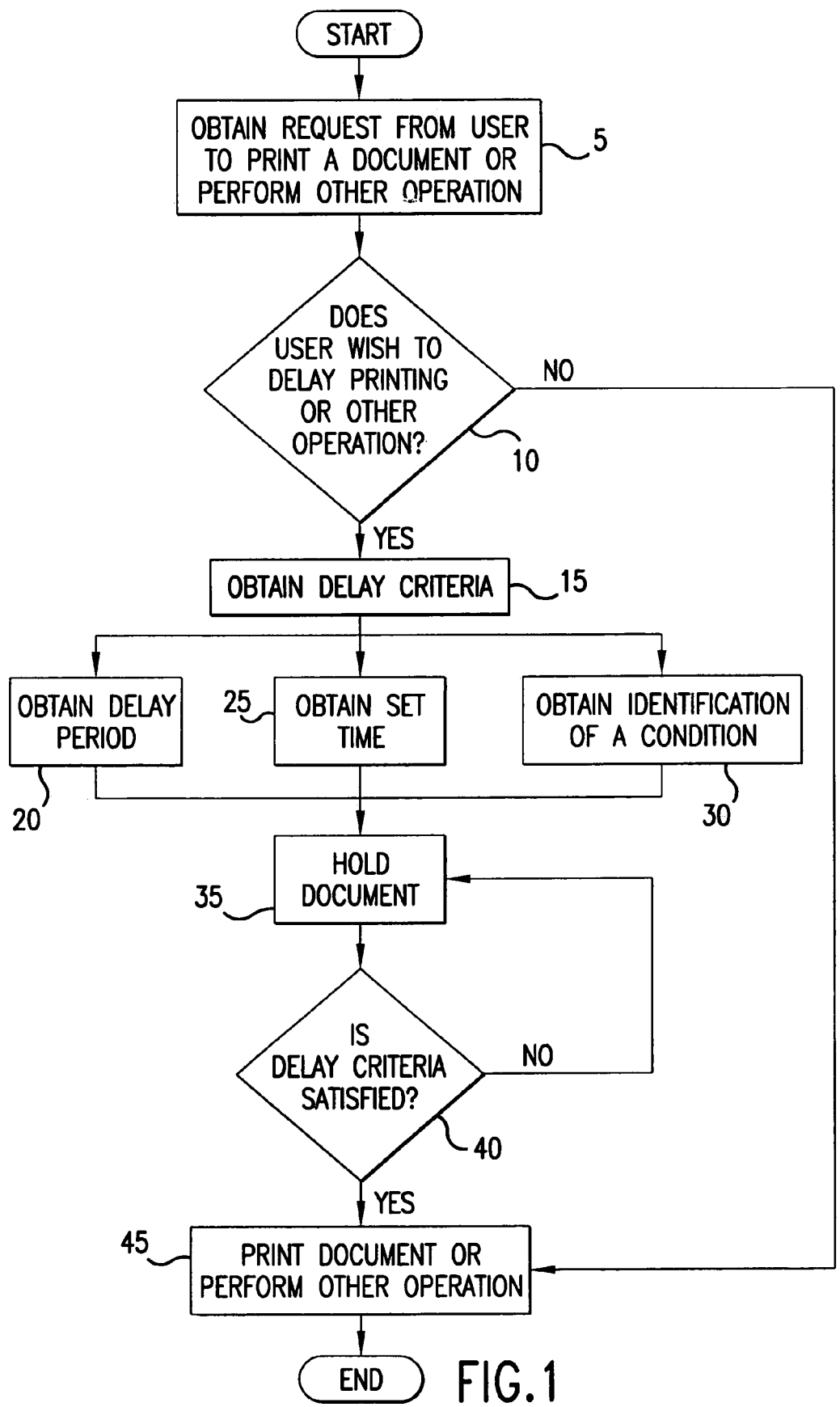
FIG. 1 illustrates a flowchart of a method for delaying a printing operation by a user-specified delay period before printing or performing another operation.

FIG. 1 illustrates a flowchart describing certain embodiments of the present invention. FIG. 1 is primarily directed at the operation that includes printing digital documents but also applies to some of the other operations that are also within the scope of certain embodiments of the present invention. A partial list of such operations, along with brief descriptions of the items in this list, is included at the end of this section of the disclosure. The methods illustrated by the flowchart of FIG. 1, and those illustrated by the flowchart of FIG. 2, can be implemented, for example, in software or firmware for controlling the operation of a CPU or other processor. The methods can be embodied within a computer-readable medium, such as a memory, containing instructions to control operation of the CPU.

Step 5 of the flowchart in FIG. 1 specifies that user instructions or requests are input into a device such as, but not limited to, a computer, a graphical interface, a personal digital assistant (PDA), a pager, a cellular phone, or other processor-based machine and that these instructions initiate the printing process for a digital document or the performance of another operation. The instructions or requests may be inputted manually, verbally or by any other method that initiates the printing process or other operation.

After the initiation of the printing process or operation, the user is asked, according to step 10, whether a time delay is desired before the printing or other operation takes place. If the user responds that he/she does not wish to use a delay, the printing or performance of the operation proceeds immediately according to step 45. However, if the user wishes to delay the print job or operation, he/she is then requested to input information concerning the length of the desired delay according to step 15.

The delay that may be input according to any of steps 20, 25 or 30 can take many forms. According to step 20, the user may specify that printing or the operation is to take place after a certain duration of time, such as 5 minutes, a half-hour, 2 days, or other time parameter. According to step 25, the user may specify that printing or the operation is to take place at a particular date and/or time (e.g., Sep. 27, 2002 at 5:42 a.m.). According to step 30, the user may specify that printing or the operation is to take place only after a particular situation has occurred (e.g., after the printer has remained idle for 45 minutes, after the office lights have been turned off, after a data-collecting or other computer routine has terminated, or upon occurrence of another event). Under certain circumstances, remote sensing may be needed to monitor the occurrence of the particular situation.

After the delay has been input, step 35 specifies that the printing operation (or other operation within the scope of the present invention) be held for the user-specified amount of time or until the user-specified date/time or situation occurs. According to certain embodiments of the present invention, "holding" the digital document to be printed can include storing the document in CPU memory, in printer memory, at a remote Internet site, or at another location. Other possible locations for storing the document will be discussed shortly in the description of the "job store".

Step 40 monitors whether the delay criteria has been satisfied. If it has not been satisfied, the document or operation is held longer according to step 35. However, once the delay criteria has been satisfied, step 45 follows.

Step 45 specifies that the document is to be printed or that the operation is performed.

Figure 2:
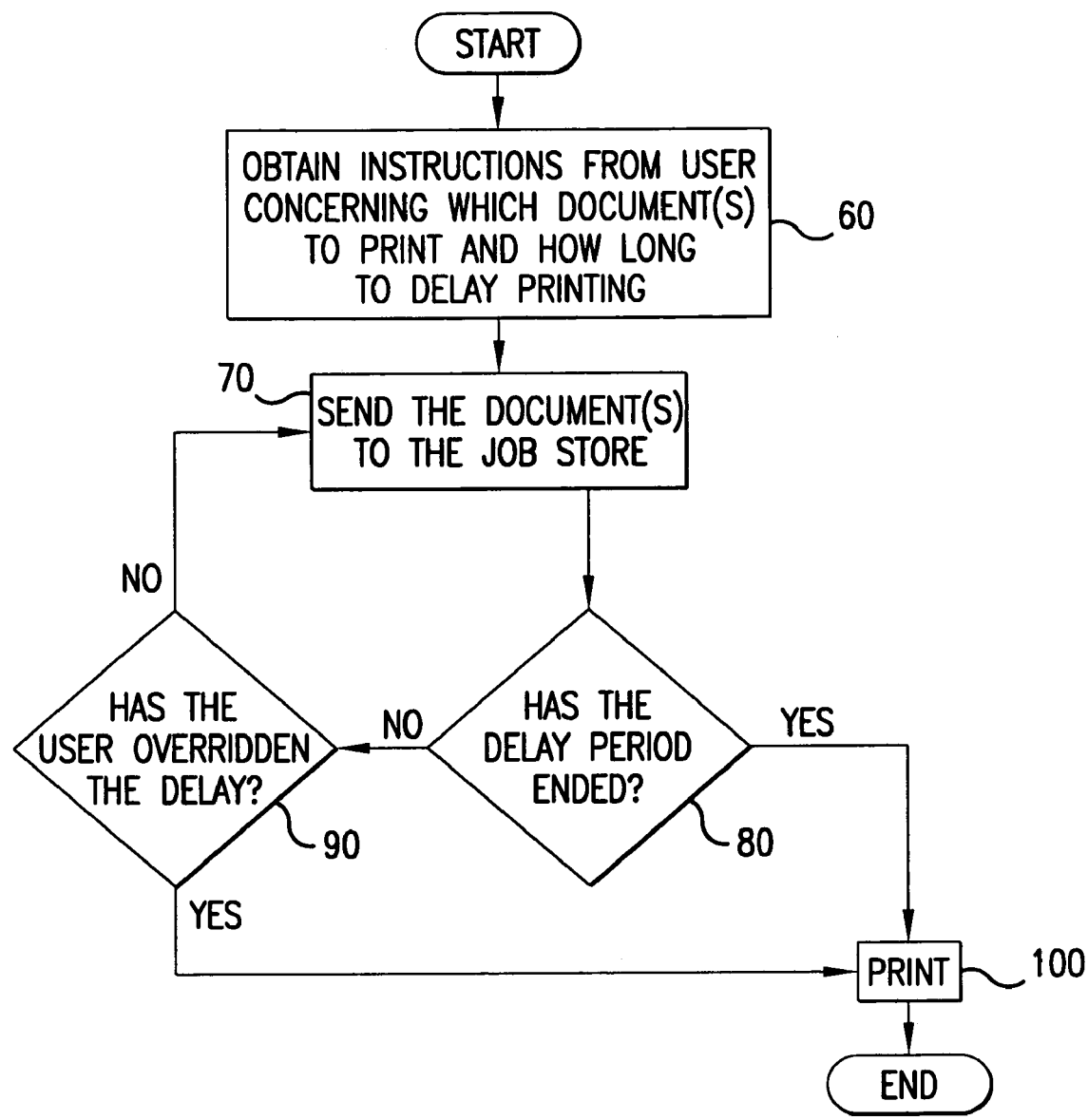
FIG. 2 illustrates a flowchart of a method for sending a delayed print operation to a job store and overriding the delay period.

FIG. 2 illustrates a flowchart describing yet other embodiments of the present invention. According to some of these embodiments, a user selects and sets the delay period for one or a number of print operations (or other operations within the scope of certain embodiments of the present invention) as specified in step 60. Step 70 then specifies that the document or documents to be printed be sent to the job store that will be described with reference to FIG. 3. Step 80 then specifies that monitoring take place of whether the delay period set forth in step 60 has expired. If it is found that the delay period has expired, the document or documents print according to step 100.

However, if it is found that the delay period has not expired, step 90 allows for monitoring of whether the user has overridden the delay period. If it is found that the delay has not been overridden, the document is kept in the job store according to step 70. However, if the delay has been overridden by the user or someone else, the document is immediately set to print according to step 100. Step 90 essentially allows for the user to change his/her mind if he/she decides that the initially inputted delay period was not appropriate. Steps 80 and 90 generally are repeated continuously until the delay period expires or the user overrides the delay period.

According to certain embodiments of the present invention, the user is also allowed, instead of completely overriding the delay period according to step 90, to re-set the delay period to another value. For example, if a user initially specified at 2:00 p.m. that a document was to be printed at 5:15 p.m. of the same day, according to the embodiments illustrated by the flowchart in FIG. 2, at 4:30 p.m., the user could override the delay and cause immediate printing at 4:30 p.m. However, according to other embodiments not illustrated in the flowchart, the user could override the 5:15 p.m. delay at 4:30 p.m. and reset it to, for example, 6:00 p.m. of the next day or until the printer has been idle for 35 minutes. The user can also, at this point, cancel the job altogether if so desired.

Figure 3:
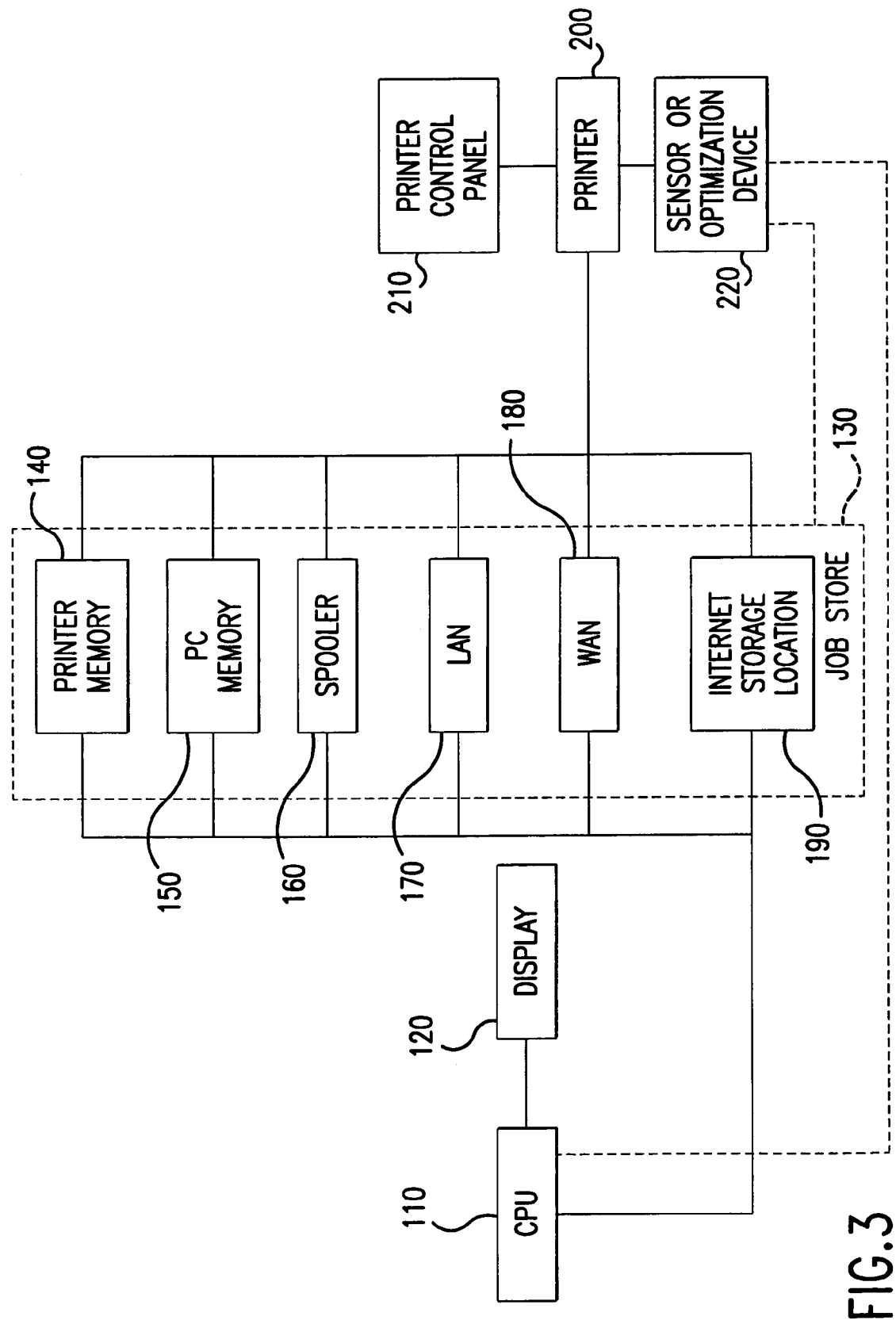
FIG. 3 illustrates a block diagram of a computing system capable of delaying and storing a printing operation.

FIG. 3 illustrates a hardware system according to certain embodiments of the present invention wherein operations within certain embodiments of the present invention may be carried out. Illustrated in FIG. 3 are a CPU 110 to which is operably connected a display 120. The CPU 110 is also operably connected to a job store 130 that can include a plurality of devices including, but not limited to, printer memories 140, personal computer (PC) memories 150, spoolers 160, local area networks (LAN) 170, wide area networks (WAN) 180 and internet storage locations 190. The job store 130 is in turn operably connected to a printer 200 that includes, optionally, a printer control panel 210 and/or a sensor 220 capable of monitoring, among other parameters, whether the printer is idle. Other sensors that monitor above-discussed conditions pertinent to the printing delay are also within the scope of the present invention and may be operably connected to the system illustrated in FIG. 3 in any manner that allows for the operation of the embodiments of the present invention as discussed above and as would be apparent to one skilled in the art practicing this invention.

According to certain embodiments of the present invention, the CPU 110 may be part of a computer, a PDA, a pager, a cellular phone, or any other device capable of generating a document. According to certain other embodiments of the present invention, the CPU 110 is any processor capable of performing any of the operation within the scope of any of the embodiments of the present invention.

The display 120 may be any interface between the user and the CPU 110 including, but not limited to, a computer monitor, a light-emitting diode (LED) display, a liquid crystal display, a display panel or other display device. According to certain embodiments of the present invention, the display 120 allows the user to view various screens (e.g., GDI) for selecting the document to be printed or other operation to be carried out. According to certain embodiments the display 120 further allows the user to view various screens (e.g., GDIs) monitor the progress of the operation selected and to send instructions, either directly or indirectly, to any of the other items illustrated in FIG. 3 or referenced herein.

In order to access screen displays such as, but not limited to, display 120, to select options and/or to input delay criteria, any of a number of input devices may be used. According to certain embodiments of the present invention, an item such as, but not limited to, a keyboard, keypad, cursor control device such as a "mouse", microphone (for voice-recognition systems), pen (for a pressure sensitive display) or IR beam emitter may be used. These devices may be operably connected to the system illustrated in FIG. 3 at any location that would permit for operation of the embodiments of the present invention. For example, a mouse and keyboard may be operably connected to the CPU 110.

The job store 130 is a location where a printing operation or other data can be stored temporarily until the user-specified delay discussed above has expired. This temporary location can include any device capable of storing the desired document(s) or data and can include any device such as, but not limited to, the memory in a printer, the memory in a PC, a spooler, a LAN, a WAN or an Internet storage location. The CPU 110 send a document or other data to the job store 130, the job store 130 holds the document or data for the user-specified amount of time and then transmits the document or data to the printer 200.

According to certain embodiments of the present invention, the printer 200 is any device capable of printing a document after it has been sent either from the CPU 110 or the job store 130. According to certain other embodiments of the present invention, the printer 200 is any device capable of displaying or operating upon the data sent to the printer 200 by the CPU 110 and/or by the job store 130.

The printer control panel 210 is typically, although not exclusively, a monitor or LED display that allows a user to monitor and/or control the status of a print job in a print queue and/or to monitor and/or control the status of the printer 200 (e.g., on/off, printing/idle, or other command). The number of print jobs already in the queue, the times at which the print jobs are expected to start and end, and the size of each of the queued print jobs are made available to users in order to help them determine optimized start times for their print jobs.

Further, since the possibility of two print jobs being requested, perhaps by different users, to start at the same time or to print in overlapping time periods exists, queuing delayed printing operations is done in the same manner as is currently done for documents sent at the same time or having overlapping printing periods that have not been delayed. According to certain embodiments of the present invention, the printer control panel 210 also allows the user to override the printing operation, to reset the delay and to activate printing remotely.

According to certain embodiments of the present invention, the sensor 220 monitors the status of the printer 200 and provides reporting data to the job store 130 and/or the CPU 110, as illustrated in FIG. 3. Although not illustrated, according to certain embodiments, one or a plurality of sensors such as sensor 220 may be operably connected to the system illustrated in FIG. 3 to monitor various conditions in the system and/or outside of the system.

Operation of the system illustrated in FIG. 3 has been discussed above and illustrated in the flowcharts of FIGS. 1 and 2. Again, similar systems that conduct operations other than printing operations are also within the scope of certain embodiments of the present invention.

Figure 4:
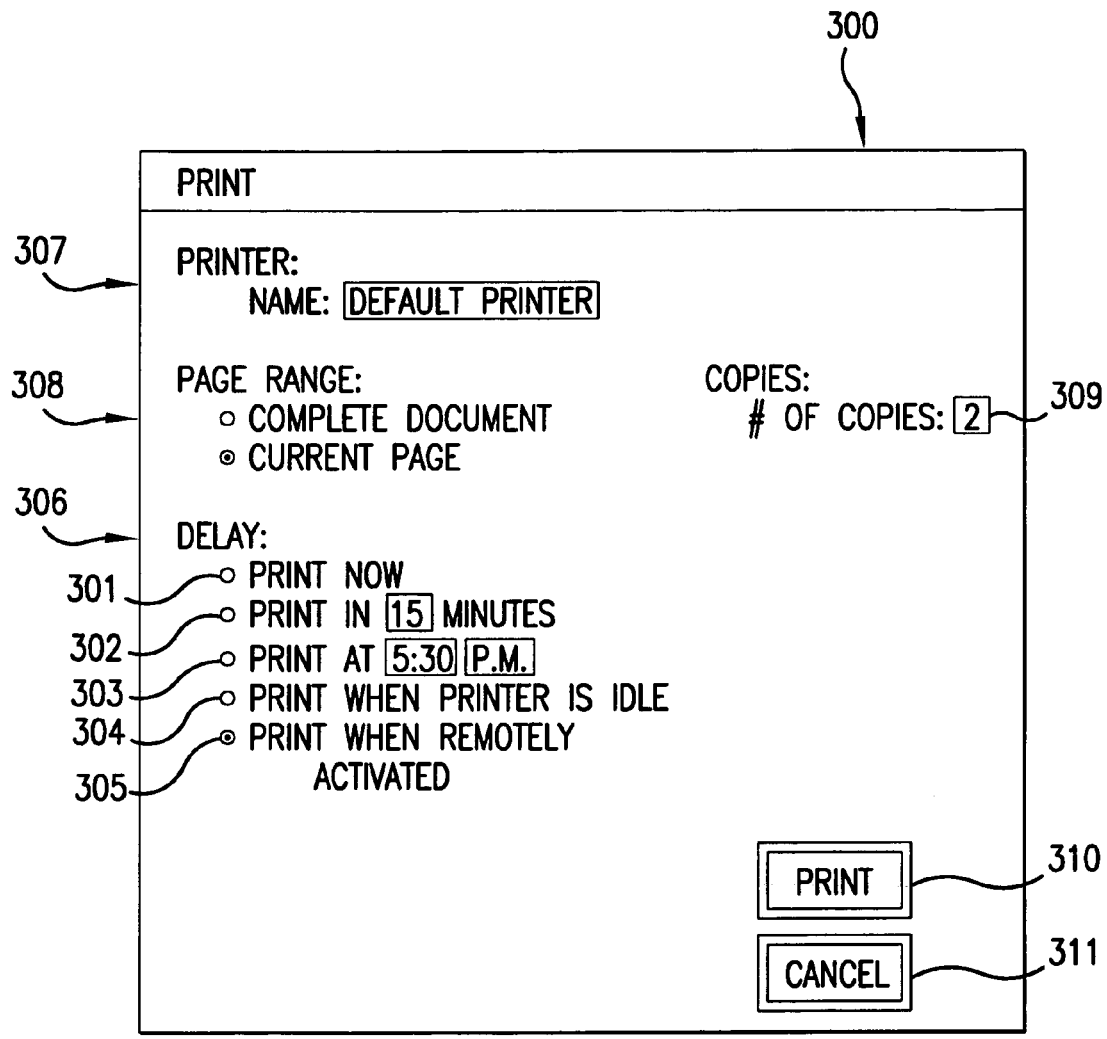
FIG. 4 illustrates a GDI that allows a user to specify the type and amount of delay before a printing operation is carried out.

FIG. 4 illustrates a GDI 300 that, according to certain embodiments of the present invention, can be displayed on the display 120, on the printer control panel 210 or on any of the devices that can be included within the job store 130. For example, the GDI 300 illustrated in FIG. 4, in section 306, allows the user to select between printing immediately ("Print Now" 301), setting a delay period ("Print in __ minutes" 302), setting a print time ("Print at __ a.m./p.m. 303), printing once the printer becomes idle ("Print when Printer is Idle" 304) or printing when the printing operation is remotely activated 305 (e.g., when the print job is selected from the queue on the printer control panel 210). GDI 300 can include, for example, a section 307 to enter a printer name, address, or other identifier; a section 308 to specify a page range for printing; a section 309 to specify a number of copies to print; a button 310 to initiate printing; and a button 311 to cancel printing.

According to certain other embodiments of the present invention, the GDI or other user interface may have an item such as, but not limited to, an icon, button, voice command, etc., that is dedicated to setting a delay for a print job. Under such a circumstance, activating the item would lead to the appearance of a sub-menu where the user would be allowed to select a particular time period for the delay, a particular time at which to print or a particular condition that has to be satisfied before printing commences in ways similar to that shown in FIG. 4.

Operations Other Than Printing Operation:

Although the embodiments of the present invention discussed above mention only print jobs that are delayed for user-specified amounts of time, certain other embodiments of the present invention are directed towards other processes that can also be delayed for user-specified amounts of time. As with the print jobs, these processes can benefit the user if they are delayed to allow for optimal system use, convenience, confidentiality, or other purpose.

For example, according to certain embodiments of the present invention, a user-defined delay period can be used for processes such as, but not limited to, e-mail messages, FTP uploads/downloads and web-site postings. For example, if computer users wished to post pictures to their web sites and download software from FTP sites without bogging down their modems or digital subscriber lines (DSL) as they were navigating the Internet, they could put time-delays on their posts and downloads and have those operations performed at another time such as while they were sleeping. Likewise, users wishing to send e-mail messages at specified future times (e.g., on a relative's birthday), can use certain embodiments of the present invention to delay sending of the messages.

Users wishing to install software when they are not otherwise using their computers (e.g., in the middle of the night) can also use the above principles according to certain embodiments of the present invention to accomplish just that. According to yet other embodiments of the present invention, Internet phone calls could be placed with a specified delay in order to leave messages (e.g., wake-up calls or reminders), thereby benefiting travelers and/or business people. Delayed webcasting could also be done such that, for example, a presentation could be made in New York at a desirable local time and the same presentation could be seen in Calcutta with an appropriate delay.

Certain embodiments of the present invention are directed not only to drivers but also, more generally, to any device or means necessary to perform the functions requested by the application. Further, although the above embodiments are representative of portions of the present invention, other embodiments of the present invention will be apparent to those skilled in the art from a consideration of this specification or practice of the present invention disclosed herein. It is intended that the specification, figures and examples be considered as exemplary only, with the present invention being defined by the claims and their equivalents.

I claim:

1. A computer program product, comprising:
   a computer-readable medium containing instructions for controlling a computer system to perform a method of delaying issuing a command for beginning an operation, the method comprising:
   requesting that a user input a delay criteria through a graphical user interface before the initiation of the operation, wherein the delay criteria include both a time and a particular situation, wherein the particular situation is selected from the group of a period of time a printer has remained idle and a lights off situation in an office; and
   delaying performance by the computer system of the operation until the delay criteria has been met;
   wherein the operation comprises at least one operation chosen from the group consisting of a print command, an e-mailing distribution, a software installation, a file transfer protocol upload, a web site posting and an internet phone call.

2. The computer program product of claim 1, wherein the delay criteria is at least one chosen from the group consisting of a time interval, a set time, and the occurrence of the particular situation.

3. The computer-readable medium of claim 1, wherein the operation comprises printing a document.

4. The computer-readable medium of claim 1, wherein the delaying step comprises storing the document in a job store.

5. The computer program product of claim 4, wherein the job store comprises at least one item chosen from the group consisting of a printer memory, a personal computer memory, a spooler, a local area network, a wide area network, and an internet storage location.

6. A method for controlling a computer system to delay issuing a command for beginning an operation comprising:
   requesting that a user input a delay criteria through a graphical user interface for the operation before an initiation of an operation; and
   delaying performance of the operation until the delay criteria has been met, wherein the delay criteria include both a time and a particular situation wherein the particular situation is selected from the group of a period of time a printer has remained idle and a lights off situation in an office;
   wherein the operation comprises at least one operation chosen from the group consisting of a print command, an e-mailing distribution, a software installation, a file transfer protocol upload, a web site posting and an internet phone call.

7. The method of claim 6, wherein delay criteria is at least one chosen from the group consisting of a time interval, a set time and the occurrence of the particular situation.

8. The method of claim 6, wherein the operation comprises printing a document.

9. The method of claim 8, wherein the delaying step comprises storing the document in a job store.

10. The method of claim 9, wherein the job store comprises at least one item from the group consisting of a printer memory, a personal computer memory, a spooler, a local area network, a wide are network and an internet storage location.

11. A computing system comprising:
    a processor;
    a user-programmable delaying device to receive a delay criteria through a graphical user interface before issuing a command for beginning an operation wherein the operation comprises at least one operation chosen from the group consisting of a print command, an e-mailing distribution, a software installation, a file transfer protocol upload, a web site posting and an internet phone call, wherein the delay criteria include both a time and a particular situation wherein the particular situation is selected from the group of a period of time a printer has remained idle and a lights off situation in an office;
    the delaying device operably connected to the processor delaying performance of the operation until the delay criteria has been met;
    a storage device operably connected to the processor; and
    a printer operably connected to the storage device.

12. The system of claim 11, wherein the delaying device can be delayed by a user-programmable time interval.

13. The system of claim 11, wherein the delaying device can be delayed until a user-programmable set time.

14. The system of claim 11, wherein the delaying device can be delayed until the occurrence of a user-programmable situation.

15. The system of claim 11, further comprising a job store.

16. The system of claim 15, wherein the job store comprises at least one item chosen from the group consisting of a printer memory, a personal computer memory, a spooler, a local area network, a wide area network and an internet storage location.

* * * * *